(12) United States Patent  (10) Patent No.: US 12,326,542 B2
Kim  (45) Date of Patent: Jun. 10, 2025

(54) LENS OPTICAL SYSTEM

(71) Applicant: SAMYANG OPTICS CO., LTD, Changwon-si (KR)

(72) Inventor: Moon Kyung Kim, Changwon-si (KR)

(73) Assignee: SAMYANG OPTICS CO., LTD, Changwon-si (KR)

( * ) Notice: Subject to any disclaimer, the term of this patent is extended or adjusted under 35 U.S.C. 154(b) by 535 days.

(21) Appl. No.: 17/772,810

(22) PCT Filed: Oct. 28, 2019

(86) PCT No.: PCT/KR2019/014232
§ 371 (c)(1),
(2) Date: Apr. 28, 2022

(87) PCT Pub. No.: WO2021/085655
PCT Pub. Date: May 6, 2021

(65) Prior Publication Data
US 2022/0390711 A1    Dec. 8, 2022

(51) Int. Cl.
*G02B 13/00* (2006.01)
*G02B 9/64* (2006.01)
(52) U.S. Cl.
CPC ........... *G02B 13/0035* (2013.01); *G02B 9/64* (2013.01)
(58) Field of Classification Search
CPC ............................ G02B 9/64; G02B 13/0035
See application file for complete search history.

(56) References Cited

U.S. PATENT DOCUMENTS

2014/0104708 A1* 4/2014 Onozaki ................. G02B 9/64
359/745
2016/0291298 A1 10/2016 Kawamura et al.

FOREIGN PATENT DOCUMENTS

| JP | 2019-074760 A | 5/2019 |
| KR | 10-2018-0119885 A | 11/2018 |
| KR | 10-2018-0123849 A | 11/2018 |
| KR | 10-2019-0003113 A | 1/2019 |

OTHER PUBLICATIONS

International Search Report issued in PCT/KR2019/014232; mailed Jul. 15, 2020.

* cited by examiner

*Primary Examiner* — Dung T Nguyen
(74) *Attorney, Agent, or Firm* — Studebaker Brackett PLLC

(57) ABSTRACT

The present disclosure relates to a lens optical system, which includes: a first lens group having a positive refractive power; a second lens group which performs focusing and has a negative refractive power; and a third lens group having a positive refractive power. A lens among lenses included in the first lens group, which is closest to an object, is a meniscus lens having a positive refractive power, the second lens group includes only a single lens, and a lens among lenses included in the third lens group, which is closest to an image, is a meniscus lens having a negative refractive power. When the second lens group performs focusing, the first lens group and the third lens group are fixed, have F number of 1.8 or lower, and have a half field of view within a range of 13 to 18 degrees.

8 Claims, 6 Drawing Sheets

LENS OPTICAL SYSTEM

CROSS-REFERENCE TO RELATED APPLICATION

This application is the U.S. National Stage of International Application No. PCT/KR2019/014232 filed Oct. 28, 2019, the entire content of which is incorporated herein by reference.

TECHNICAL FIELD

The present invention relates to a lens optical system for performing a fast focusing and enhancing photographing qualities.

BACKGROUND ART

As the demand for imaging devices having high mobility and portability increases, the use of a CSC (Compact System Camera) also increases. It is a form that removes a pentaprism or a reflection mirror from tan existing DSLR (digital single lens reflex). However, in such a CSC, interchangeable lenses using a full-frame imaging device are required to obtain high-quality photographs. Accordingly, the larger the size of the imaging device, the larger the interchangeable lens and the larger the volume. When the interchangeable lens coupled to the CSC becomes heavy, it decreases portability and convenience. Therefore, even if a full-frame imaging device is used, it is necessary to reduce an overall length of a product to some extent.

In order to move lenses in a focusing group having an inner focus type, the focusing speed necessarily decreases due to the heavy weight of the focusing group when many lenses are contained in the focusing group. In particular, the CSC generally adopts an auto-focusing function for usability but it causes disadvantages such as inconvenience in photographing and degradation of image quality.

TECHNICAL PROBLEM

Aspects of the present invention provide a lens optical system for increasing the auto-focusing speed and correcting various aberrations by use of a single focusing lens in order to enhance the photographing quality.

However, aspects of the present invention are not restricted to those set forth herein. The above and other aspects of the present invention will become more apparent to one of ordinary skill in the art to which the present invention pertains by referencing the detailed description of the present invention given below.

SOLUTION TO PROBLEM

According to an aspect of an exemplary embodiment, there is provided a lens optical system comprising: a first lens group having a positive refractive power; a second lens group which performs focusing and has a negative refraction power; and a third lens group having a positive refractive power, wherein a lens closest to an object side among lenses in the first lens group is a meniscus lens having a positive refractive power, the second lens group consists of a single lens, and a lens closest to an image side among lenses in the third lens group is a meniscus lens having a negative refractive power, and wherein the first lens group and the third lens group are fixed while the second lens group performs focusing, and wherein the lens optical system has an F number of 1.8 or lower and a half field of view within a range of 13 to 18 degrees.

The first lens group has a double-junction lens having a negative refractive power.

The third lens group includes an iris.

The lenses included in the first, second and third lens optical systems are spherical lenses.

The lens closest to the image side among lenses in the third lens group is configured to be convex toward the image side.

The lens optical system satisfies the following equation:

$$-0.15 \le \frac{D_f}{f_2} \le -0.05,$$

where the $D_f$ is a total travel length of the lenses in the second lens group when focusing from the infinity to the shortest imaging distance, and the $f_2$ is a focal length of the second lens group.

The lens optical system satisfies the following equation:

$$0.8 \le \frac{D_{total}}{f} \le 0.13,$$

where the $D_{total}$ is a distance from an object plane of the lens closest to the object side O in the first lens group to an image plane of the lens closest to the image side I in the third lens group, and the f is an overall focal length of the lens optical system at the infinity.

$$0.53 \le \frac{1}{n_{av}} \le 0.58,$$

The lens optical system satisfies the following equation: where the $n_{av}$ is an average refractive index of all lenses included in the lens optical system.

The lens optical system satisfies the following equation: $35 \le |G2V-G3V| \le 65$, where the G2V is an Abbe number of the second lens from the object side in the first lens group, and the G3V is an Abbe number of the third lens from the object side in the first lens group.

The details of other embodiments are included in the detailed description and drawings.

ADVANTAGEOUS EFFECTS OF INVENTION

Embodiments of the invention provides at least the following effects.

According to the lens optical system, it is possible to increase the auto-focusing speed, downsize the photographing device by maintaining its overall length, and guarantee high-resolution of the photographed image by correcting various aberrations.

MODE FOR THE INVENTION

Figure 1:
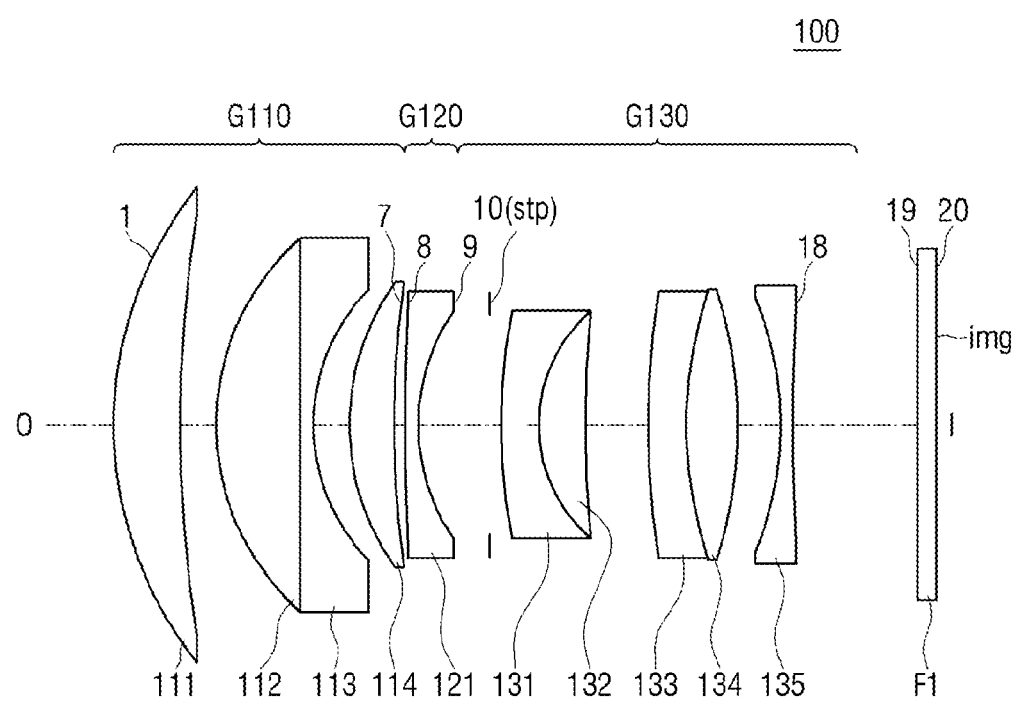
FIG. 1 is a view showing a lens optical system according to a first embodiment of the present invention.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

FIG. 1 is a view showing a lens optical system according to a first embodiment of the present invention.

Referring to FIG. 1, a lens optical system 100 includes a first lens group G110, a second lens group G120 and a third lens group G130 in order from an object side O to an image side I.

In particular, lens optical system 100 includes a first lens group G110 having a positive refractive power, a second lens group G120 having a positive refractive power and preforming a focusing, and a third lens group G130 having a positive refractive power. The lens closest to the object side O in the first lens group G110 is a meniscus lens having a positive refractive power, the second lens group G120 only includes a single lens, the lens closest to the image side I in the third lens group G130 a meniscus lens having a negative refractive power. While the second lens group G120 performs focusing, the first lens group G110 and the third lens group G130 are fixed, have F number of 1.8 or lower, and have a half field of view within a range of 13 to 18 degrees.

Hereinafter, the image side I may indicate a direction where an image plane IMG is positioned, in which an image is formed on the image plane IMG, and the object side O may indicate a direction in which a subject is positioned. In addition, the "object side" of a lens means, for example, the left side of the drawing toward a lens surface where the subject is positioned.

In addition, for brevity, hereinafter in describing the lens in each lens group G110, G120, G130, the front and back are defined in order from the object side O to the image side I. For example, the first lens 111 of the first lens group G110 is to the closest lens to the object side O and the last lens 114 is the closest lens to the image side I among the lenses in the first lens group G110. Accordingly, the object side O is referred to the left or the front and the image side I is referred to the right or the back in the drawings. Further, the lens constituting the lens optical system 100 are referred to the first lens, the second lens . . . the nth lens (n is a natural number) in order from the object side to the image side I.

According to the first embodiment of the present invention, the first lens group G110 includes a first lens to a fourth lens 111, 112, 113, 114. Here, the first lens 111 may a meniscus lens having a positive refractive power. In addition, the second lens 112 and the third lens 113 may be double-junction lenses bonded to each other. The second lens group G120 includes a fifth lens 121, and the third lens group G130 includes a sixth lens to a tenth lens 131, 132, 133, 134, 135. Here, the sixth lens and the seventh lens 131, 132 may be double-junction lenses bonded to each other, and the eighth lens and the ninth lens 133, 134 may be also double-junction lenses bonded to each other. An iris ST may be arranged between the fifth lens and the sixth lens 121, 131.

The first lens group G110 of the lens optical system has a positive refractive power and includes one or more lenses, and the first lens in the first lens group G110 may be a meniscus lens having a positive refractive power. Further, the first lens group G110 may include double-junction lenses having a negative refractive power.

The lens optical system includes a combination of a lens group having a positive refractive power and another lens group having a negative refractive power, to function as a telephoto type in which the physical length is shorter than the focal length. The lens group having a negative refractive power may be a second lens group G120 which performs focusing.

As stated above, since the first lens group G110 has a positive refractive power, it is possible to reduce the aperture of the second lens group G120 which performs focusing.

However, even though the aperture of the second lens group G120 is reduced, the second lens group G120 cannot sufficiently light-weighted on condition that the second lens G120 includes a plurality of lenses. Accordingly, the second lens group G120 the lens optical system 100 according to an embodiment of the present invention can include only one lens to achieve the light weight.

The focusing of the lens optical system 100 is performed by moving the second lens G120 from the object side O to the image side I, that is, in a direction from the front to the back. Accordingly, it is possible to achieve a fast auto-focusing in condition that the second lens group G120 is light-weighted.

In addition, the second lens group G120 includes lenses of plano-concave or biconcave types. the lens of plano-concave or biconcave type has a strong negative refractive power, and thus can maximize the auto-focusing speed by minimizing the travel range while the second lens group G120 performs focusing.

The third lens group G130 of the lens optical system has a positive refractive power and includes one or more lenses, and the last lens 135 in the third lens group G130 may be a meniscus lens having a negative refractive power.

The third lens group G130 of the lens optical system serves as correcting an image-plane curvature aberration. Since the third lens group G130 has a positive refractive power, it causes the image-plane curvature aberration where the image plane is curved toward the object side. To this end, the curvature aberration can be corrected on condition that the last lens 135 in the third lens group G130, that is, the lens closest to the image side I among lenses in the third lens group G130 is formed to have a negative refractive power. We will describe later about the image-plane curvature aberration in detail.

While the second lens group G120 moves between the front and the back to perform focusing, the first lens group and third lens group G110, G130 is fixed. As such, it is possible to reduce the size of the imaging device using the lens optical system 100 by fixing the overall length of the lens optical system 100 and using the inner focusing.

The lens optical system 100 may include an iris (ST) at least in the first lens group G110 or in the third lens group G130. The iris (ST) serves as changing an effective diameter of a lens by determining the amount of light entering the lens.

According to the first embodiment of the present invention, the iris (ST) may be arranged between the fifth lens (121) and the sixth lens (131). As such, it is possible to reduce the effective diameter of the focusing group and increase the auto-focusing speed if the iris (ST) is arranged right after the second lens group G120, but the position of the iris is not limited to this embodiment. Alternatively, if the iris (ST) is arranged right before the second lens group G120, the apertures of the second lens group G120 and the third lens group G130 can be reduced.

The lens optical system 100 may have F number of 1.8 or lower, and have a half field of view (FOV) within a range of 13 to 18 degrees.

According to the embodiment of the present invention, all the lenses in the optical lens system 100 may be spherical lenses to reduce manufacturing cost in contrast to aspherical lenses.

Figure 3:
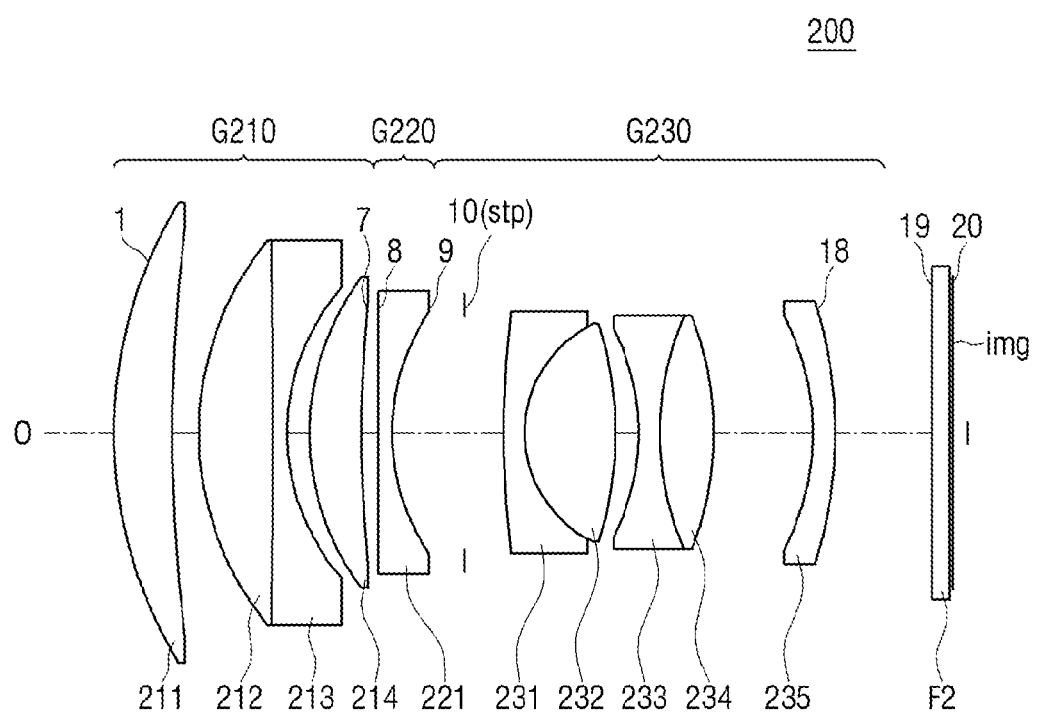
FIG. 3 is a view showing a lens optical system according to a second embodiment of the present invention.

FIG. 3 is a view showing a lens optical system according to a second embodiment of the present invention.

Referring to FIG. 3, a lens optical system 200 includes a first lens group G210 having a positive refractive power, a second lens group G220 having a negative refractive power, and a third lens group G230 having a positive refractive power.

According to the second embodiment of the present invention, the first lens group G210 includes a first lens to a fourth lens 211, 212, 213, 214. Here, the first lens 211 may a meniscus lens having a positive refractive power. In addition, the second lens 212 and the third lens 213 may be double-junction lenses bonded to each other. The second lens group G220 includes a fifth lens 221, and the third lens group G230 includes a sixth lens to a tenth lens 231, 232, 233, 234, 235. Here, the sixth lens and the seventh lens 231, 232 may be double-junction lenses bonded to each other, and the eighth lens and the ninth lens 233, 234 may be also double-junction lenses bonded to each other. An iris ST may be arranged between the fifth lens and the sixth lens 221, 231. We will describe the second embodiment of the present invention based on the difference from the first embodiment.

According to the second embodiment of the present invention, the lens closest to the image side I in the third lens group G230, that is, the tenth lens 235 may be convex toward the image side I.

Each lens in the lens optical system may not be fully transparent but semi-transparent, that is, reflecting light in part. The partial reflection of light comes from the difference of refractive indices between both surfaces of a lens, and there might be an unnecessary image due to superposition of the light partially reflected between both surfaces of a lens or adjacent surfaces of two lenses. This undesirable phenomenon is referred to "ghost effect", which may be a factor of quality degradation in the captured image.

The cover glass that protects the imaging device has a high reflexibility, and thus the above-mentioned ghost effect will be intensified, specially in case that the last lens 235 of the third lens group G230 closest to the image device is planar or concave toward the image side I. Accordingly, the lens optical system 200 according to the present invention has the last lens 235 of the third lens group G235, that is convex to the image side I, and this can prevent the degradation of the image quality by dispersing the light reflected from the cover glass.

Figure 5:
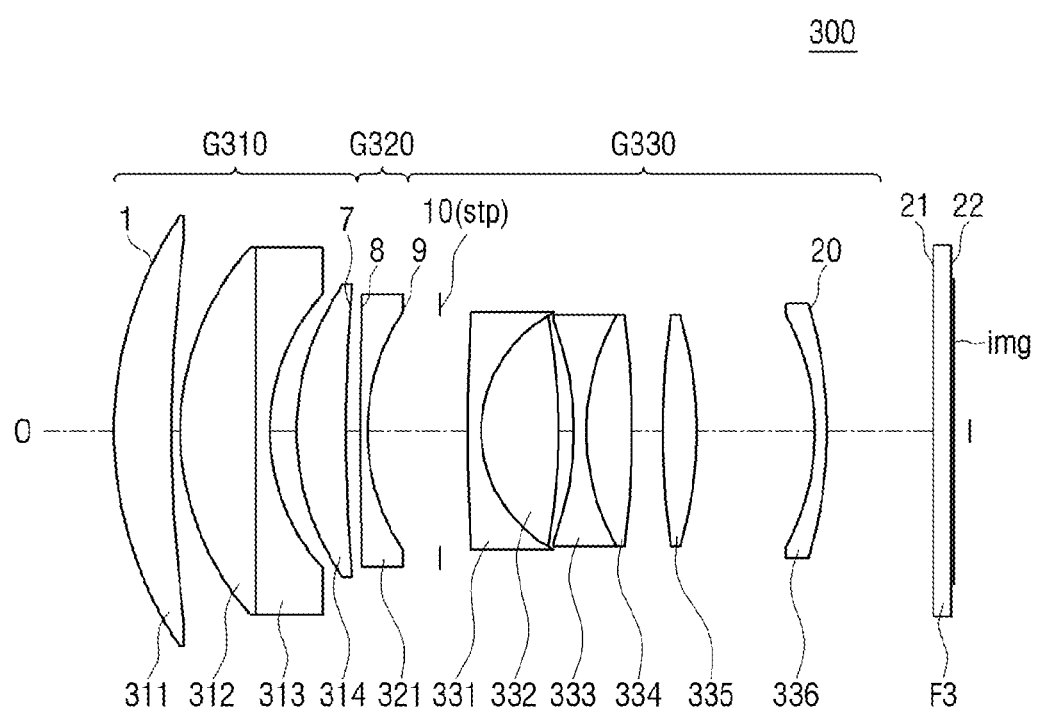
FIG. 5 is a view showing a lens optical system according to a third embodiment of the present invention.

FIG. 5 is a view showing a lens optical system according to a third embodiment of the present invention.

Referring to FIG. 5, a lens optical system 300 includes a first lens group G310 having a positive refractive power, a second lens group G320 having a negative refractive power, and a third lens group G330 having a positive refractive power.

According to the third embodiment of the present invention, the first lens group G310 of the lens optical system 300 includes a first lens to a fourth lens 311, 312, 313, 314. Here, the first lens 311 may a meniscus lens having a positive refractive power. In addition, the second lens 312 and the third lens 313 may be double-junction lenses bonded to each other. The second lens group G320 includes a fifth lens 321, and the third lens group G330 includes a sixth lens to an eleventh lens 331, 332, 333, 334, 335, 336. Here, the sixth lens and the seventh lens 331, 332 may be double-junction lenses bonded to each other, and the eighth lens and the ninth lens 333, 334 may be also double-junction lenses bonded to each other. The eleventh lens 336 that is the last lens in the third lens group G330 is convex toward the image side I to prevent the ghost effect.

In the above-mentioned three embodiments, at least one imaging devices F1, F2, F3 may be positioned at the image side I of the third lens group G130, G230, G330. The at least one imaging device F1, F2, F3 may have a cover glass, a low-pass filter, and an IR-cut filter, etc. The imaging device may implement the lens optical systems 100, 200, 300 without those optical filters. The image from the photographed object enters the image plane ("img") after passing through the lenses in the lens optical system 100, 200, 300. Here, the image plane may be, for example, an imaging device surface or an image sensor surface.

The lens optical system 100, 200, 300 according to the embodiments of the present invention may satisfy the following Equation 1. For brevity, the following equations will be described in reference to FIG. 1, but they may be also applied to the other lens optical systems.

$$-0.15 \leq \frac{D_f}{f_2} \leq -0.05 \qquad \text{[Equation 1]}$$

Here, $D_f$ is a total travel length of the lenses in the second lens group G120 when focusing from the infinity to the shortest imaging distance, and $f_2$ is a focal length of the second lens group G120.

If $D_f/f_2$ is less than the lower limit of Equation 1, the travel length of the second lens group G120 will increase excessively to decrease the auto-focusing speed while performing focusing. In contrast, If $D_f/f_2$ is greater than the upper limit of Equation 1, the travel length of the second lens group G120 will decrease excessively, and thus a driving source having high accuracy is necessary for this situation. This may degrade the degree of precision when using a driving source of a normal performance. Accordingly, if the lens optical system 100 satisfies Equation 1, it can guarantee a fast auto-focusing and enhance a degree of freedom in selecting a driving source for the second lens group G120.

The lens optical systems according to the various embodiment of the present invention may satisfy the following Equation 2.

$$0.8 \leq \frac{D_{total}}{f} \leq 0.13 \qquad \text{[Equation 2]}$$

Here, $D_{total}$ is a distance from the object plane of the lens closest to the object side O in the first lens group G110 to the image plane of the lens closest to the image side I in the third lens group G130, and f is a focal length of the overall lens optical system 100 at the infinity.

If $D_{total}/f$ is greater than the upper limit of Equation 2, the total length of the lens optical system 100 will increase excessively to make it difficult to downsize the lens optical system 100. In contrast, If $D_{total}/f$ is less than the lower limit of Equation 2, the focal length will increase excessively. Accordingly, lager sized lenses are needed and the overall length of the lens optical system becomes longer.

The lens optical systems according to the various embodiment of the present invention may satisfy the following Equation 3.

$$0.53 \leq \frac{1}{n_{av}} \leq 0.58 \qquad \text{[Equation 3]}$$

Here, $n_{av}$ is an average refractive index of all lenses used in the lens optical system 100.

Petzval curvature or Image plane curvature means a phenomenon where an image from the flat object is curved due to the difference in refraction angles of rays passing through arbitrary positions of a lens. That is, rays passing through between the central portion and the peripheral portion of the lens are focused at the different positions and the focal plane of the flat object make a curved surface.

Generally, the larger the material refractive index, the smaller the Petzval curvature. However, when only the material with a high refractive index is used, the cost of materials of the lens increases. On the contrary, when the refractive index is lowered, the unit cost of the materials of the lens may be lowered, but the amount of occurrence of an image plane curvature aberration increases. Therefore, it is advantageous in that the upper and lower limits of Equation 3 limit the material amount of the lenses constituting the lens optical system 100 while effectively suppressing the amount of Petzval curvature.

The lens optical systems according to the various embodiment of the present invention may satisfy the following Equation 4.

$$35 \leq |G2V\text{-}G3V| \leq 65 \qquad \text{[Equation 4]}$$

Here, G2V is the Abbe number of the second lens from the object side O in the first lens group G110, and G3V is the Abbe number of the third lens from the object side O in the first lens group G110.

Abbe number is a quantified index showing dispersion characteristics of a lens. In particular, Abbe number is of a reciprocal number of a dispersion index, and the dispersion index represents characteristics of a medium for dispersing light. The bigger the Abbe number is, the less the dispersing amount of light through a lens will be.

As the difference of dispersion indices between the adjacent two lenses gets bigger, the chromatic aberration is reduced more. However, the lenses having low dispersion indices generally have low refraction indices, and thus the correction effect of Petzval curvature is reduced, specifically, when |G2V-G3V| is less than the lower limit of Equation 4. In contrast, when |G2V-G3V| is greater than the upper limit of Equation 4, the correction effect of chromatic aberration is weaker because the difference of dispersion indices between the two lenses is not so sufficient.

In the present invention, the specific lens optical system may be designed as shown in the following tables. Hereinafter, "f" is an effective focal length of the overall lens optical system (unit: mm), "F/#" is an F number, "Object" is a target to be imaged, "Radius" is a radius of curvature (unit: mm), "Thick" is a thickness of a lens or a thickness of air layer between two lenses, "nd" is a refractive index, and "vd" is an Abbe number.

Lens surfaces are added with a number (1, 2, 3, . . . n; n is a natural number) indicating a surface of all lenses arranged from the object side O to the image side I. For brevity, the numbers are added only to the object plane of the lens closest to the object side O and the image plane of the lens closest to the image side I in the drawings.

First Embodiment

Table 1 shows design data for the lens optical system 100 according to the first embodiment of the present invention. Here, the effective focal length, the F number and the field of view are as follows.

$f=84$ mm, $F/1.44$, $FOV=28.8°$

TABLE 1

| Surface | Radius | Thickness | nd | vd | Note |
|---|---|---|---|---|---|
| object | infinity | D0 | | | |
| 1 | 52.666 | 8.676 | 1.94595 | 17.98 | Group 1 |
| 2 | 194.255 | 5 | | | (Fix) |
| 3 | 34.856 | 10.554 | 1.60311 | 60.69 | |
| 4 | 17746.93 | 1.7 | 1.94595 | 17.98 | |
| 5 | 25.829 | 4.615 | | | |
| 6 | 32.439 | 5.868 | 1.8042 | 46.5 | |
| 7 | 141.515 | D1 | | | |
| 8 | 393.149 | 1.7 | 1.72825 | 28.32 | Group 2 |
| 9 | 26.869 | D2 | | | (Focusing) |
| 10(ST) | infinity | 1.455 | | | |
| 11 | 85.562 | 5 | 1.84666 | 23.78 | Group 3 |
| 12 | 19.536 | 6.016 | 1.83481 | 42.72 | (Fix) |
| 13 | 146.613 | 8.02 | | | |
| 14 | 115.367 | 5 | 1.5168 | 64.2 | |
| 15 | 54.896 | 7.16 | 1.92286 | 20.88 | |
| 16 | −48.639 | 5.07 | | | |

TABLE 1-continued

| Surface | Radius | Thickness | nd | vd | Note |
|---|---|---|---|---|---|
| 17 | −44.573 | 1.7 | 1.7725 | 49.62 | |
| 18 | 651.176 | 15.709 | | | |
| 19 | infinity | 2.5 | 1.5168 | 64.2 | Filter |
| 20 | infinity | 0.5 | | | |
| img | infinity | D3 | | | |

Table 2 shows data such as a variable distance (D0, D1, D2, D3), a field of view, an F number (F/#) at positions of infinity and TL=0.89 m, respectively, in the lens optical system 100 according to the first embodiment of the present invention. Here, "TL" is the shortest imaging distance in a lens optical system, and "STOP" is an effective diameter of an iris. "in Air" denotes a distance from the last surface of the optical system to the imaging device when there is no filter positioned in front of the imaging device. That is, "in Air" means a focal length in case of no optical devices. In addition, "EFL/MAG" is a ratio between an effective focal length (EFL) and a magnifying power (MAG), and "OAL" is an overall length of the lens optical system, and denotes a distance from the object side to the image plane of the lens closest to the object side O of the lens optical system.

TABLE 2

| Config | Infinity | TL = 0.89 m |
|---|---|---|
| D0 | Infinity | 785.0017 |
| D1 | 1.45428 | 6.45428 |
| D2 | 9.25601 | 4.25601 |
| D3 | 0.002 | −0.061 |
| ST (STOP) | 14.161 | 14.161 |
| in Air | 17.869 | 17.965 |
| EFL/MAG | 84 | 0.11249 |
| FOV | 14.443 | 11.8 |
| F/# | 1.44 | 1.518 |
| OAL | 106.955 | 106.892 |

Figure 2:
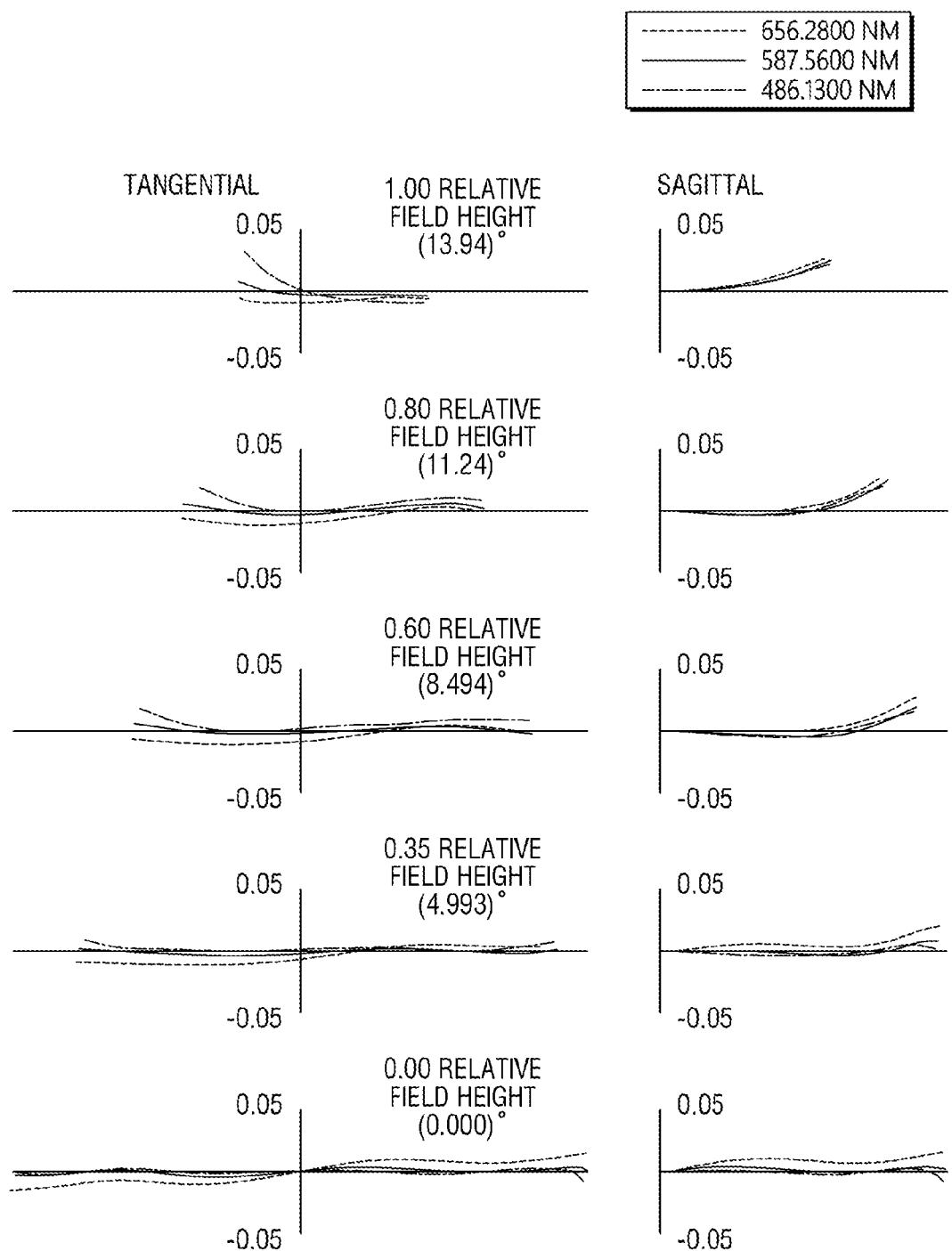
FIG. 2 is a view showing a ray fan diagram of the lens optical system, according to the first embodiment of the present invention.

FIG. 2 is a view showing a ray fan diagram of the lens optical system 100 at an infinite distance, according to the first embodiment of the present invention. Here, a dotted line shows a ray fan graph for C-line, a solid line shows a ray fan graph for D-line, and a dashed line shows a ray fan graph for F-line. The C-line has wavelength of 656.2800 nm, the D-line has wavelength of 587.5600 nm, and the F-line has wavelength of 486.1300 nm.

Second Embodiment

Table 3 shows design data for the lens optical system 200 according to the second embodiment of the present invention. Here, the effective focal length, the F number and the field of view are as follows.

$f=84$ mm, $F/1.45$, $FOV=28.8°$

TABLE 3

| Surface | Radius | Thickness | nd | vd | Note |
|---|---|---|---|---|---|
| object | infinity | D0 | | | |
| 1 | 61.369 | 8.128 | 1.94595 | 17.98 | Group 1 |
| 2 | 267.229 | 3.444 | | | (Fix) |
| 3 | 42.082 | 10.265 | 1.59282 | 68.62 | |
| 4 | −1009.05 | 1.9 | 1.94595 | 17.98 | |
| 5 | 31.157 | 2.949 | | | |
| 6 | 35.525 | 7.158 | 1.83481 | 42.72 | |
| 7 | 202.347 | D1 | | | |
| 8 | 2411.287 | 1.9 | 1.70154 | 41.15 | Group 2 |

TABLE 3-continued

| Surface | Radius | Thickness | nd | vd | Note |
|---|---|---|---|---|---|
| 9 | 30.502 | D2 | | | (Focusing) |
| 10(ST) | infinity | 5 | | | |
| 11 | 113.666 | 3 | 1.62004 | 36.3 | Group 3 |
| 12 | 16.741 | 12.404 | 1.60311 | 60.69 | (Fix) |
| 13 | −48.669 | 3.012 | | | |
| 14 | −32.362 | 3 | 1.70154 | 41.15 | |
| 15 | 44.585 | 7.319 | 2.00069 | 25.46 | |
| 16 | −43.277 | 13.664 | | | |
| 17 | −34.024 | 3 | 1.94595 | 17.98 | |
| 18 | −61.45 | 13 | | | |
| 19 | infinity | 2.5 | 1.5168 | 64.2 | Filter |
| 20 | infinity | 0.5 | | | |
| img | infinity | D3 | | | |

Table 4 shows data such as a variable distance (DO, D1, D2, D3), a field of view, an F number (F/#) at positions of infinity and TL=0.91 m, respectively, in the lens optical system 200 according to the second embodiment of the present invention.

TABLE 4

| Config | Infinity | TL = 0.91 m |
|---|---|---|
| D0 | Infinity | 794.7097 |
| D1 | 2.22311 | 7.22311 |
| D2 | 10.27521 | 5.27521 |
| D3 | 0.01 | −0.041 |
| ST (STOP) | 15.911 | 15.911 |
| in Air | 15.138 | 15.27 |
| EFL/MAG | 84 | 0.11144 |
| FOV | 14.443 | 12.11 |
| F/# | 1.45 | 1.526 |
| OAL | 114.653 | 114.602 |

Figure 4:
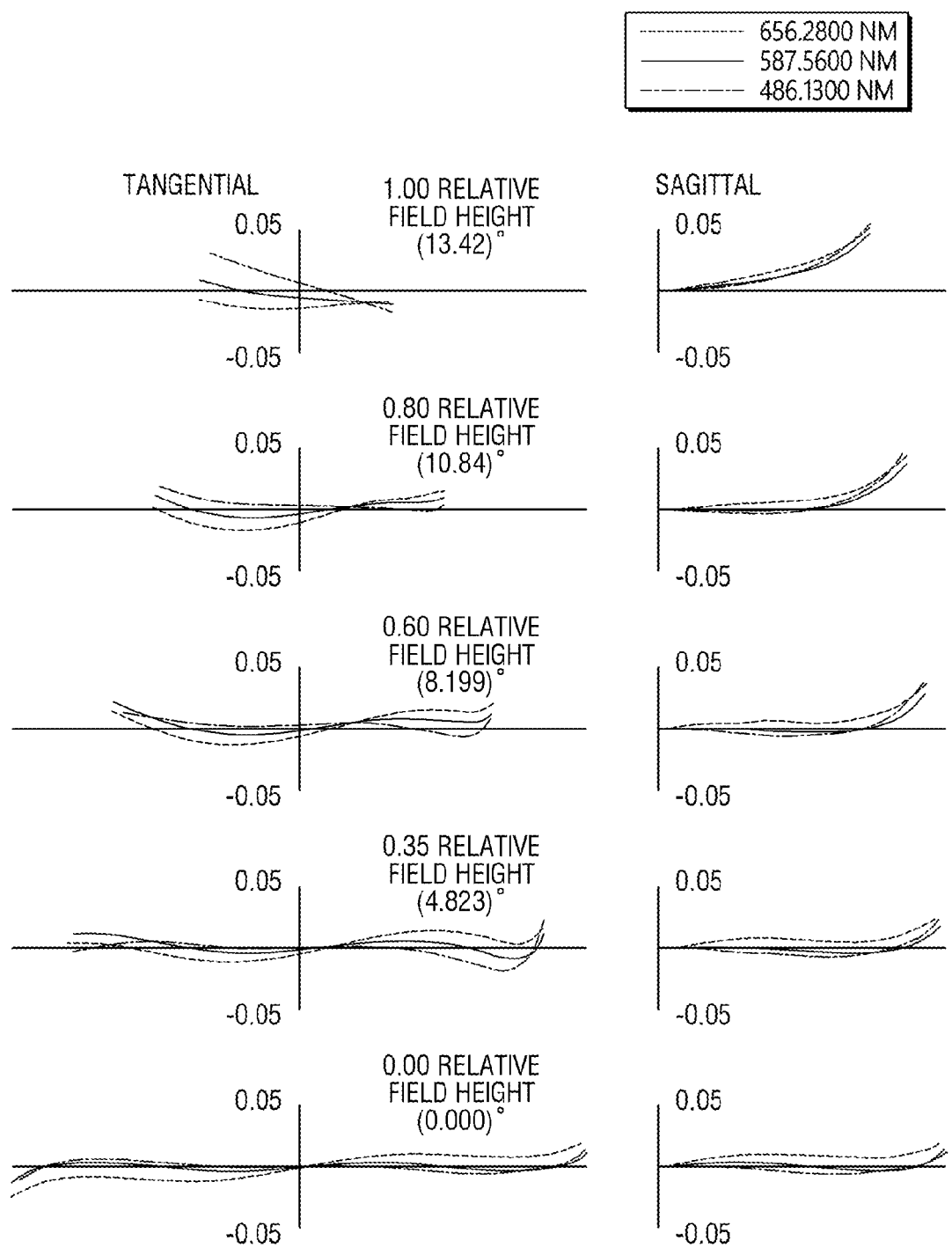
FIG. 4 is a view showing a ray fan diagram of the lens optical system, according to the second embodiment of the present invention.

FIG. 4 is a view showing a ray fan diagram of the lens optical system 200 at an infinite distance, according to the second embodiment of the present invention. Here, a dotted line shows a ray fan graph for C-line, a solid line shows a ray fan graph for D-line, and a dashed line shows a ray fan graph for F-line.

Third Embodiment

Table 5 shows design data for the lens optical system 300 according to the third embodiment of the present invention. Here, the effective focal length, the F number and the field of view are as follows.

$f=85.86$ mm, $F/1.47$, $FOV=28.9°$

TABLE 5

| Surface | Radius | Thickness | nd | vd | Note |
|---|---|---|---|---|---|
| object | infinity | D0 | | | |
| 1 | 58.93 | 7.67 | 2.00069 | 25.46 | Group 1 |
| 2 | 235.051 | 1.232 | | | (Fix) |
| 3 | 40.211 | 10.395 | 1.497 | 81.61 | |
| 4 | infinity | 1.9 | 1.84666 | 23.78 | |
| 5 | 29.846 | 3.637 | | | |
| 6 | 35.905 | 6.862 | 1.7725 | 49.62 | |
| 7 | 225.077 | D1 | | | |
| 8 | 656.333 | 1 | 1.713 | 53.94 | Group 2 |
| 9 | 32.93 | D2 | | | (Focusing) |
| 10(ST) | infinity | 4.197 | | | |
| 11 | 541.689 | 1.9 | 1.7552 | 27.53 | Group 3 |
| 12 | 19.223 | 10.447 | 1.713 | 53.94 | (Fix) |
| 13 | −94.886 | 2.331 | | | |
| 14 | −44.171 | 1.5 | 1.7552 | 27.53 | |
| 15 | 33.915 | 6.366 | 1.92286 | 20.88 | |

TABLE 5-continued

| Surface | Radius | Thickness | nd | vd | Note |
|---|---|---|---|---|---|
| 16 | −167.037 | 4.428 | | | |
| 17 | 145.893 | 4.589 | 2.001 | 29.13 | |
| 18 | −65.755 | 16.474 | | | |
| 19 | −36.344 | 1.5 | 1.94595 | 17.98 | |
| 20 | −64.119 | 14.678 | | | |
| 21 | infinity | 2.5 | 1.5168 | 64.2 | Filter |
| 22 | infinity | 0.5 | | | |
| img | infinity | D3 | | | |

Table 6 shows data such as a variable distance (D0, D1, D2, D3), a field of view, an F number (F/#) at positions of infinity and TL=0.90 m, respectively, in the lens optical system 300 according to the third embodiment of the present invention.

TABLE 6

| Config | Infinity | TL = 0.90 m |
|---|---|---|
| D0 | Infinity | 784 |
| D1 | 1.94373 | 6.99684 |
| D2 | 9.91877 | 4.86565 |
| D3 | 0.03 | 0.033 |
| ST (STOP) | 16.097 | 15.18 |
| in Air | 16.854 | 17.045 |
| EFL/MAG | 84 | 0.11281 |
| FOV | 14.46 | 12.292 |
| F/# | 1.47 | 1.565 |
| OAL | 116 | 116.003 |

Figure 6:
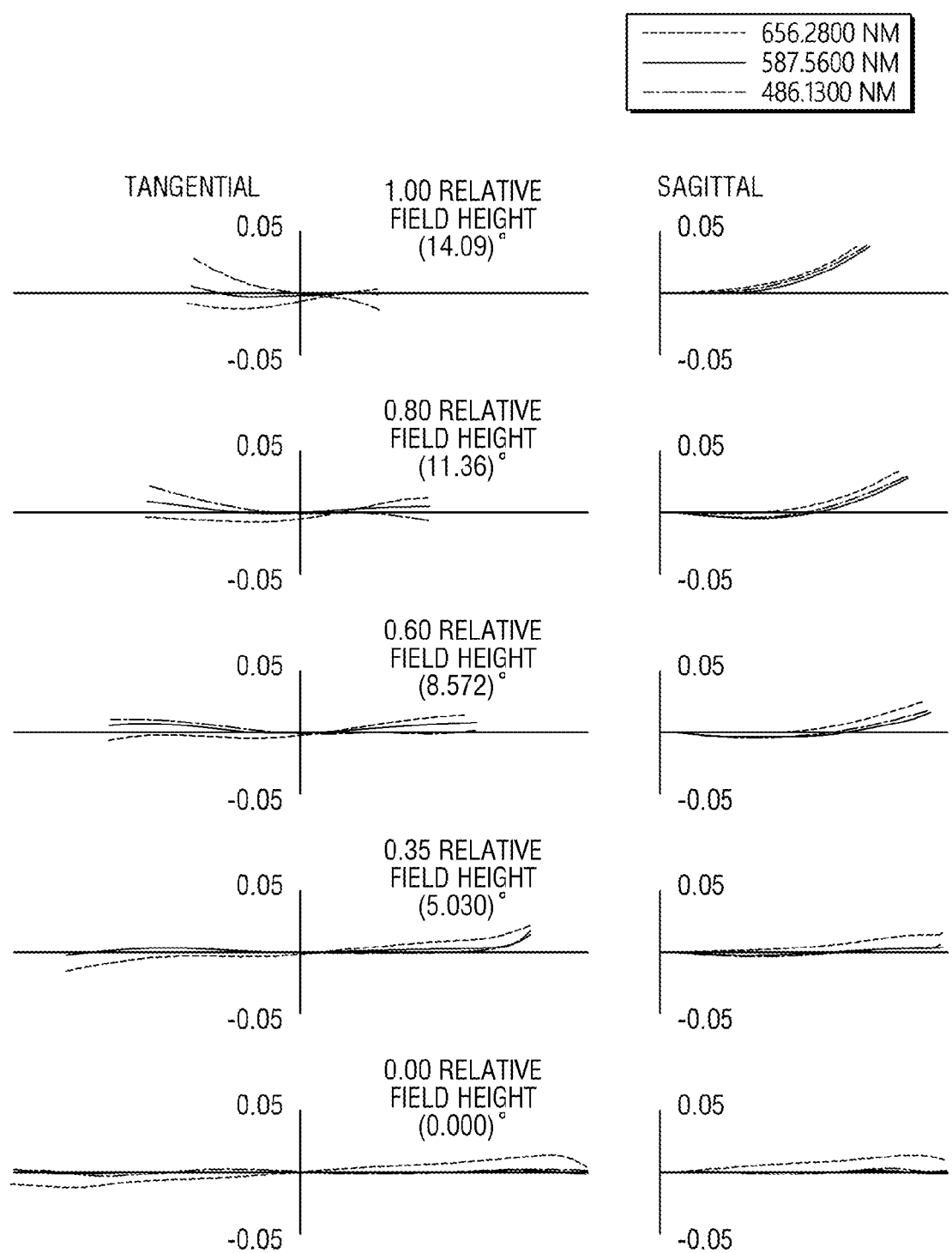
FIG. 6 is a view showing a ray fan diagram of the lens optical system, according to the third embodiment of the present invention.

FIG. 6 is a view showing a ray fan diagram of the lens optical system 300 at an infinite distance, according to the third embodiment of the present invention. Here, a dotted line shows a ray fan graph for C-line, a solid line shows a ray fan graph for D-line, and a dashed line shows a ray fan graph for F-line.

The following Table 7 shows the numbers calculated from the equations 1, 2 and 3 for three lens optical systems 100, 200, 300 according to the embodiments of the present invention.

TABLE 7

| | first embodiment | second embodiment | third embodiment |
|---|---|---|---|
| $D_f$ | 5 | 5 | 5.053 |
| $f_2$ | −39.352 | −43.798 | −46.897 |
| $D_{total}$ | 88.2443 | 98.6428 | 98.2917 |
| f | 84 | 84 | 84 |
| $n_{av}$ | 1.79211 | 1.78924 | 1.81119 |
| $-0.15 \leq \dfrac{D_f}{f_2} \leq -0.05$ (Equation 1) | −0.1271 | −0.1142 | −0.1077 |
| $0.8 \leq \dfrac{D_{total}}{f} \leq 0.13$ (Equation 2) | 1.05053 | 1.17432 | 1.17014 |
| $0.53 \leq \dfrac{1}{n_{av}} \leq 0.58$ (Equation 3) | 0.558 | 0.5589 | 0.55212 |

Referring to Table 7, we can understand that the lens optical systems 100, 200, 300 according to the embodiments of the present invention satisfy the equations 1, 2 and 3.

The foregoing description of the present invention is intended for illustration, and it will be understood by those skilled in the art that the present invention may be easily modified in other specific forms without changing the technical spirit or essential features of the present invention will be. Therefore, it should be understood that the embodiments described above are exemplary in all respects and not restrictive. The scope of the present invention is represented by the following claims, and it should be construed that all changes or modifications derived from the meaning and scope of the claims and their equivalents are included in the scope of the present invention.

The invention claimed is:

1. A lens optical system comprising:
a first lens group having a positive refractive power;
a second lens group which performs focusing and has a negative refraction power; and
a third lens group having a positive refractive power,
wherein a lens closest to an object side among lenses in the first lens group is a meniscus lens having a positive refractive power, the second lens group consists of a single lens, and a lens closest to an image side among lenses in the third lens group is a meniscus lens having a negative refractive power,
wherein the first lens group and the third lens group are fixed while the second lens group performs focusing,
wherein the lens optical system has an F number of 1.8 or lower and a half field of view within a range of 13 to 18 degrees, and
wherein the lens optical system satisfies the following equation:

$$-0.15 \leq \frac{D_f}{f_2} \leq -0.05$$

where the $D_f$ is a total travel length of the lenses in the second lens group when focusing from the infinity to the shortest imaging distance, and the $f_2$ is a focal length of the second lens group.

2. The lens optical system of claim 1,
wherein the first lens group has a double-junction lens having a negative refractive power.

3. The lens optical system of claim 1,
wherein the third lens group includes an iris.

4. The lens optical system of claim 1,
wherein the lenses included in the first, second and third lens optical systems are spherical lenses.

5. The lens optical system of claim 1,
wherein the lens closest to the image side among lenses in the third lens group is configured to be convex toward the image side.

6. The lens optical system of claim 1,
wherein the lens optical system satisfies the following equation:

$$0.8 \leq \frac{D_{total}}{f} \leq 0.13$$

where the $D_{total}$ is a distance from an object plane of the lens closest to the object side O in the first lens group to an image plane of the lens closest to the image side I in the third lens group, and the f is an overall focal length of the lens optical system at the infinity.

7. The lens optical system of claim 1,
wherein the lens optical system satisfies the following equation:

$$0.53 \leq \frac{1}{n_{av}} \leq 0.58$$

where the $n_{av}$ is an average refractive index of all lenses included in the lens optical system.

8. The lens optical system of claim 1, wherein the lens optical system satisfies the following equation:

$$35 \leq |G2V\text{-}G3V| \leq 65$$

where the G2V is an Abbe number of the second lens from the object side in the first lens group, and the G3V is an Abbe number of the third lens from the object side in the first lens group.

* * * * *